United States Patent
Tanimura et al.

(10) Patent No.: US 12,172,524 B1
(45) Date of Patent: Dec. 24, 2024

(54) MOTOR MOUNT SYSTEM

(71) Applicant: Nissan Motor Co., Ltd., Yokohama (JP)

(72) Inventors: Koji Tanimura, Kanagawa (JP); Seiji Ishizu, Kanagawa (JP); Yusuke Harukawa, Kanagawa (JP); Kazuki Kubota, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/710,072

(22) PCT Filed: Nov. 17, 2021

(86) PCT No.: PCT/JP2021/042259
§ 371 (c)(1),
(2) Date: May 14, 2024

(87) PCT Pub. No.: WO2023/089697
PCT Pub. Date: May 25, 2023

(51) Int. Cl.
*B60K 6/40* (2007.10)
(52) U.S. Cl.
CPC ..................... *B60K 6/40* (2013.01)
(58) Field of Classification Search
CPC ....................................................... B60K 6/40
See application file for complete search history.

(56) References Cited

U.S. PATENT DOCUMENTS

| | | | | |
|---|---|---|---|---|
| 5,351,930 | A * | 10/1994 | Gwinn | B64D 27/40 244/54 |
| 9,158,868 | B2 * | 10/2015 | Jomaa | B60K 5/1241 |
| 2008/0078917 | A1 * | 4/2008 | Roehrl | E02F 9/00 248/555 |
| 2021/0364059 | A1 * | 11/2021 | Hayashi | F16F 15/08 |

FOREIGN PATENT DOCUMENTS

| | | |
|---|---|---|
| CN | 210436996 U | 5/2020 |
| JP | 2008-55970 A | 3/2008 |
| JP | 2009-286304 A | 12/2009 |

* cited by examiner

*Primary Examiner* — Bryan A Evans
(74) *Attorney, Agent, or Firm* — Young Basile Hanlon & MacFarlane, P.C.

(57) ABSTRACT

A motor mount system includes a motor unit and a frame that supports the motor unit via four bush mounts. The four bush mounts have configurations that are identical to each other. Among the four bush mounts, a bush mount is closest to a center of gravity of driving reaction force input to two bush mounts disposed in front of the motor unit, or a center of gravity of driving reaction force input to two bush mounts disposed behind the motor unit, and the bush mount is disposed in a state where the bush mount is rotated in a direction in which rigidity to a load in a vertical direction is higher than rigidity of other bush mounts.

2 Claims, 7 Drawing Sheets

MOTOR MOUNT SYSTEM

TECHNICAL FIELD

The present invention relates to a motor mount system.

BACKGROUND

In Japanese Unexamined Patent Application Publication No. 2009-286304, a pair of left and right motors of which rotating shafts are aligned coaxially in a vehicle width direction are arranged at a center part in the vehicle width direction below a lower surface part of a rear part of a vehicle body. The motors and left and right rear wheels at positions which are substantially aligned in the vehicle width direction of the motors are connected by drive shafts, and the motors drive the left and right rear wheels for travelling. A generator for generating motor drive power receives a rotational output of an internal combustion engine and is arranged at a center part in the vehicle width direction in front of the motors. A cradle frame extending in a front-rear direction is disposed at the lower surface part of the vehicle body, the cradle frame integrally supports the generator and the left and right motors, and a front part and a rear part of the cradle frame are attached to the lower surface part of the vehicle body via bush mounts.

SUMMARY

However, in the motor mount system described above, when the arrangement of the bush mounts disposed at four points so as to form a rectangular shape in plan view is asymmetric, in the general use of a bush mount, a shaft deviation may occur on an output shaft of a motor unit.

Although it is possible to suppress the shaft deviation of the output shaft of the motor unit by setting a rigidity difference according to arrangement positions of the bush mounts at the four points, in this case, it may not be possible to use the same parts (common parts) for all of the bush mounts at the four points.

The present invention has been devised in view of the above problem, and an object of the present invention is to provide a motor mount system capable of suppressing a shaft deviation of an output shaft of a motor unit caused by asymmetrical arrangement of bush mounts at four points by using the same parts for all of the bush mounts.

A motor mount system according to one aspect of the present invention includes a motor unit and a frame that supports the motor unit via four bush mounts. The four bush mounts have configurations that are identical to each other. Among the four bush mounts, a bush mount is closest to a center of gravity of driving reaction force input to two bush mounts disposed in front of the motor unit, or a center of gravity of driving reaction force input to two bush mounts disposed behind the motor unit, and the bush mount is disposed in a state where the bush mount is rotated in a direction in which rigidity to a load in a vertical direction is higher than rigidity of other bush mounts.

The present invention provides a motor mount system capable of suppressing a shaft deviation of an output shaft of a motor caused by asymmetrical arrangement of bush mounts at four points by using the same parts for all of the bush mounts.

DETAILED DESCRIPTION

Figure 1:
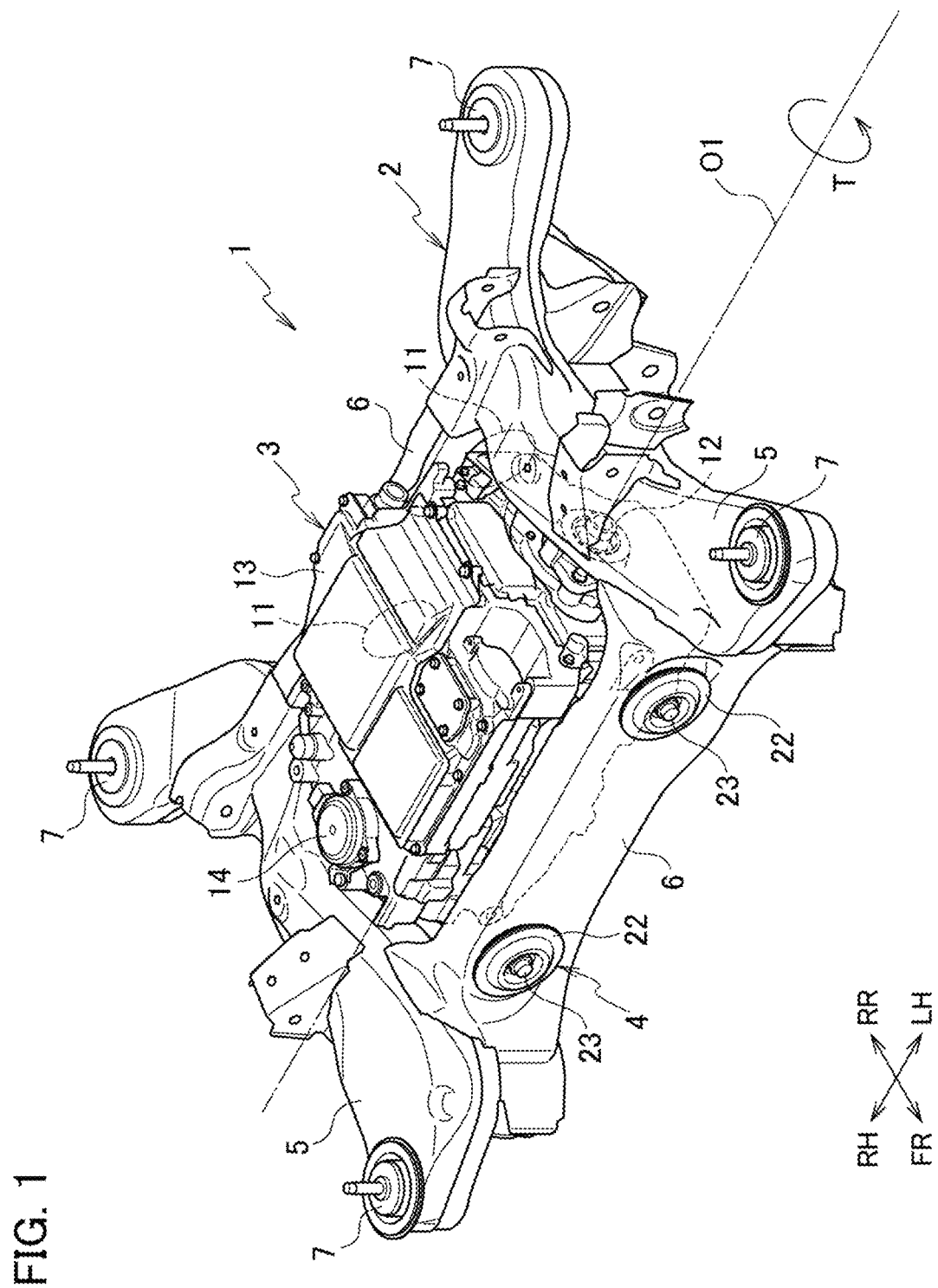
FIG. 1 is a perspective view of a motor mount system according to an embodiment of the present invention.
Figure 2:
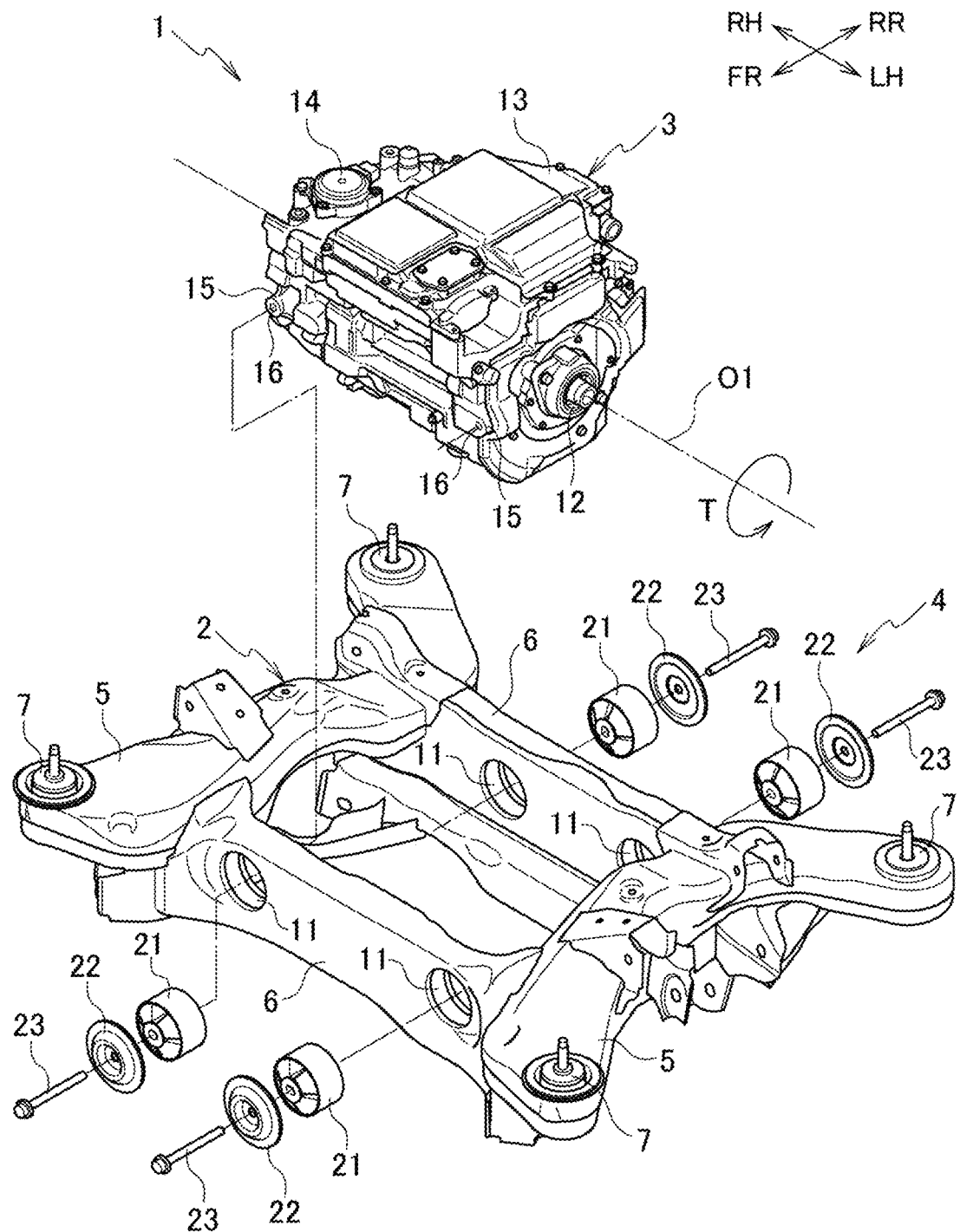
FIG. 2 is an exploded perspective view of a motor mount system according to an embodiment of the present invention.
Figure 3:
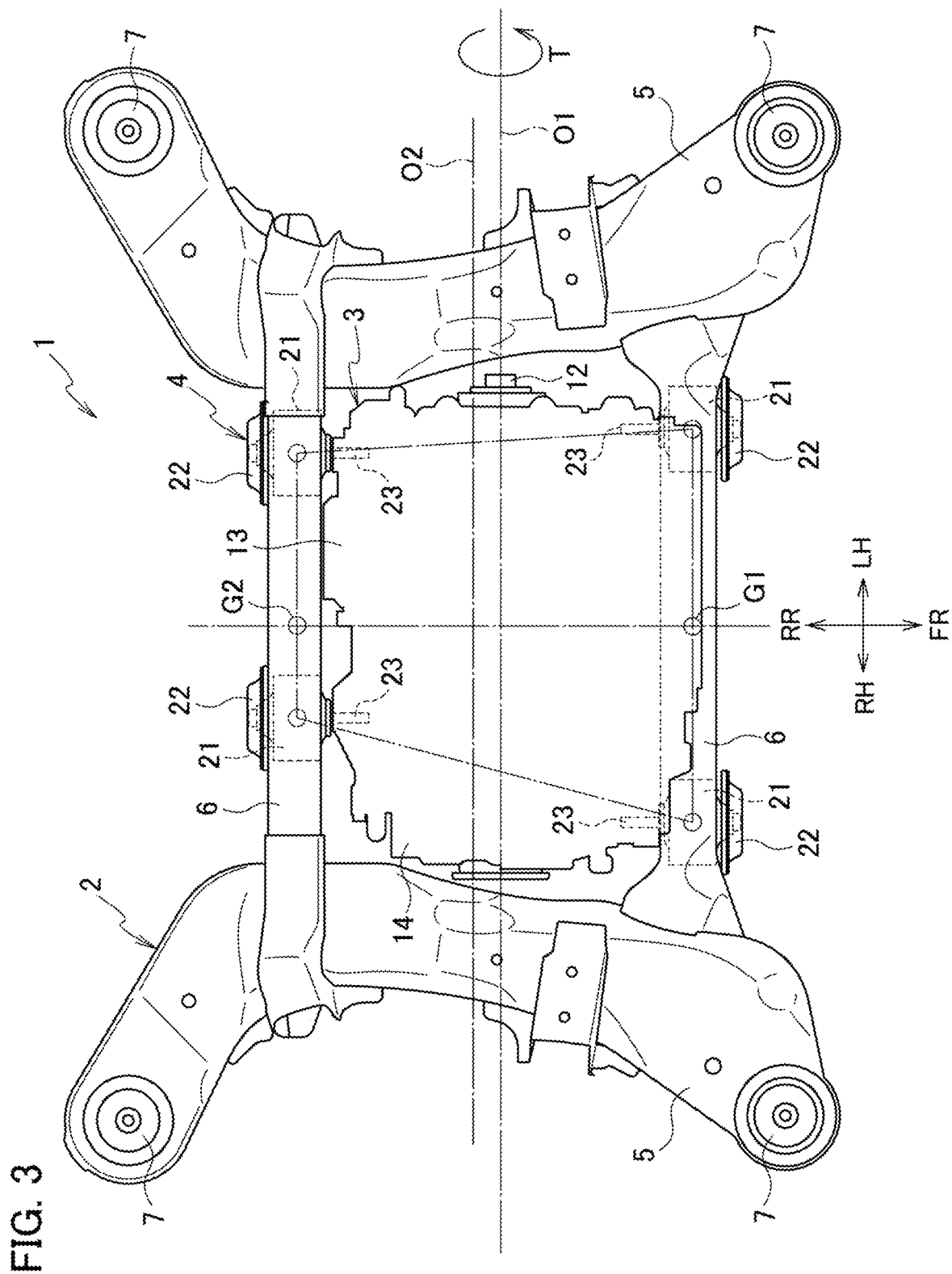
FIG. 3 is a plan view of a motor mount system according to an embodiment of the present invention.

An embodiment will be described with reference to the accompanying drawings. In the illustration of the drawings, the same parts are denoted with the same reference numerals, and therefore the description thereof is omitted.

[Configuration of Motor Mount System 1]

A configuration of a motor mount system 1 according to the present embodiment will be described with reference to FIGS. 1 to 5. In the drawings, a front side of a vehicle is illustrated as FR, a rear side of a vehicle is illustrated as RR, a right hand in a vehicle width direction is illustrated as RH, and a left hand in a vehicle width direction is illustrated as LH.

In the present embodiment, the motor mount system 1 is mounted on what is referred to as a hybrid electric vehicle (HEV). The hybrid electric vehicle has a drive source that is obtained by combining an electric motor (motor) and an internal combustion engine such as a gasoline engine or a diesel engine.

In one embodiment, the motor mount system 1 can be mounted on a battery electric vehicle (BEV) having only the electric motor (motor) as the drive source.

In another embodiment, the motor mount system 1 can be mounted on a fuel cell vehicle (FCV) having the electric motor (motor) as the drive source and driving the electric motor with power generated by a fuel cell.

The motor mount system 1 is disposed in a motor room located at the rear of a vehicle, for example. The motor mount system 1 includes a frame 2, a motor unit 3, and a motor mount unit 4.

The frame 2 is also referred to as a sub-frame. The frame 2 supports the motor unit 3 via four bush mounts 21, which will be described later.

The frame 2 has a pair of left and right side members 5 and a pair of front and rear cross members 6. Insulators 7 are disposed at ends of each side member 5 in front and rear directions of a vehicle, and the frame 2 is attached on a lower surface of a rear side member (not illustrated) via the insulators 7.

Two support holes 11 are disposed in the cross member 6 on the front side and the cross member 6 on the rear side, that is four support holes 11 are disposed, of which central axes C1 are arranged so as to be along a vehicle front-rear direction and to which the bush mounts 21 are press-fitted.

In the cross member 6 on the front side, two support holes 11 on the front side are disposed, of which central axes C1 are arranged so as to be along the vehicle front-rear direction. Meanwhile, in the cross member 6 on the rear side, two support holes 11 on the rear side are disposed, of which central axes C1 are arranged so as to be along the vehicle front-rear direction.

Figure 4:
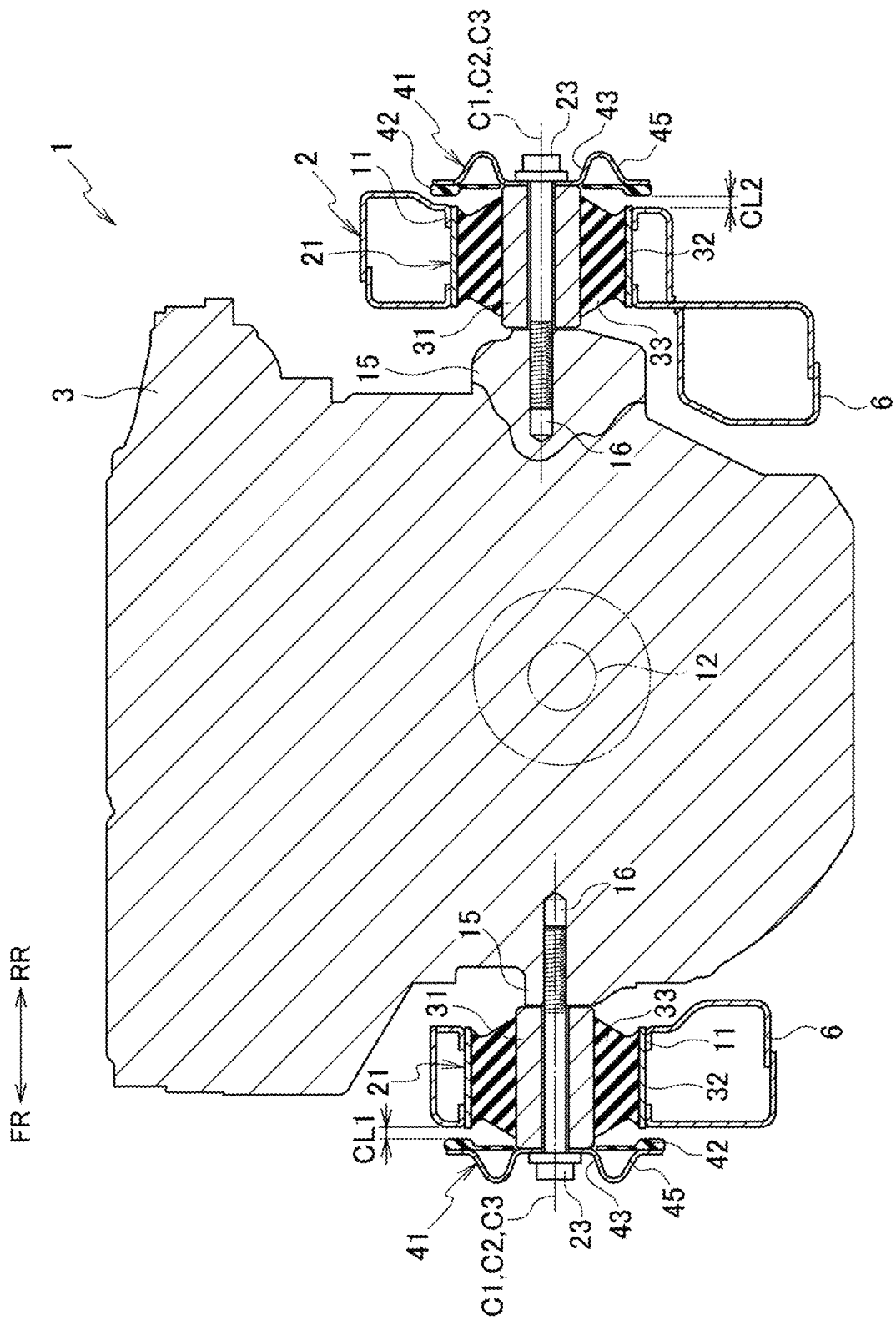
FIG. 4 is a sectional side view schematically illustrating a motor mount system according to an embodiment of the present invention.

In the present embodiment, height positions in a vertical direction of the central axes C1 of the support holes 11 on the rear side are formed to be higher than height positions in the vertical direction of the central axes C1 of the support holes 11 on the front side (see FIG. 4).

In one embodiment, height positions in the vertical direction of the central axes C1 of the support holes 11 on the front side may be formed to be higher than height positions in the vertical direction of the central axes C1 of the support holes 11 on the rear side.

In another embodiment, height positions in the vertical direction of the central axes C1 of the support holes 11 on the front side may be formed to be the same as height positions in the vertical direction of the central axes C1 of the support holes 11 on the rear side.

The motor unit 3 is disposed such that an output shaft 12 thereof is along the vehicle width direction and generate a driving torque T for vehicle travel. The motor unit 3 includes a motor 13 and a planetary gear mechanism 14 as a speed reducer.

Four boss parts 15 to which the bush mounts 21 are fastened are formed at a lower part of the motor unit 3, and a bolt hole 16 as a fastening hole is disposed in each of the boss parts 15.

Two bolt holes 16 are disposed at the front of the motor unit 3 and two bolt holes 16 are disposed at the rear of the motor unit 3, that is four bolt holes 16 are disposed, of which central axes C2 are formed so as to be along the vehicle front-rear direction.

Bolt holes 16 on the front side, of which central axes C2 are arranged so as to be along the vehicle front-rear direction, are disposed at the front of the motor unit 3. Meanwhile, bolt holes 16 on the rear side, of which central axes C2 are arranged so as to be along the vehicle front-rear direction, are disposed at the rear of the motor unit 3.

In the present embodiment, similar to the support holes 11, height positions in a vertical direction of the central axes C2 of the bolt holes 16 on the rear side are formed to be higher than height positions in the vertical direction of the central axes C2 of the bolt holes 16 on the front side (see FIG. 4).

In one embodiment, similar to the case of the support holes 11, the height positions in the vertical direction of the central axes C2 of the bolt holes 16 on the front side may be formed to be higher than the height positions in the vertical direction of the central axes C2 of the bolt holes 16 on the rear side.

In another embodiment, similar to the case of the support holes 11, the height positions in the vertical direction of the central axes C2 of the bolt holes 16 on the front side may be formed to be the same as the height positions in the vertical direction of the central axes C2 of the bolt holes 16 on the rear side.

In the present embodiment, the motor 13 is a coaxial motor.

In one embodiment, the motor 13 may be another type of motor such as a parallel shaft motor.

In another embodiment, the motor unit 3 may not have a speed reducer and may be constituted by the motor 13 alone.

The motor mount unit 4 includes the bush mounts (motor mounts) 21 as insulators and stoppers 22.

Two bush mounts 21 are disposed at the front of the motor unit 3 and two bush mounts 21 are disposed at the rear of the motor unit 3, that is four bush mounts 21 are disposed, of which central axes C3 are arranged so as to be along the vehicle front-rear direction, and to which the reaction force of the driving torque T is input.

At the front of the motor unit 3, two bush mounts 21 on the front side are disposed, of which central axes C3 are arranged so as to be along the vehicle front-rear direction. Meanwhile, at the rear of the motor unit 3, two bush mounts 21 on the rear side are disposed, of which central axes C3 are arranged so as to be along the vehicle front-rear direction.

The four bush mounts 21 have the same configuration as each other and are configured such that the rigidity (load capacity) to a load in a direction orthogonal to each central axis C3 changes along a circumferential direction.

Each of the four bush mounts 21 includes an inner cylinder 31 fastened to the motor unit 3 by a fastening member (bolt) 23, an outer cylinder 32 press-fitted into the support hole 11 disposed in the frame 2, and an elastic body 33 disposed between an outer periphery of the inner cylinder 31 and an inner periphery of the outer cylinder 32.

The inner cylinder 31 has a long hole 34 through which a shaft part of the fastening member 23 is inserted. In order to press-fit the outer cylinder 32 into the support hole 11, an outer diameter of the outer cylinder 32 is slightly larger than an inner diameter of the support hole 11.

Figure 5:
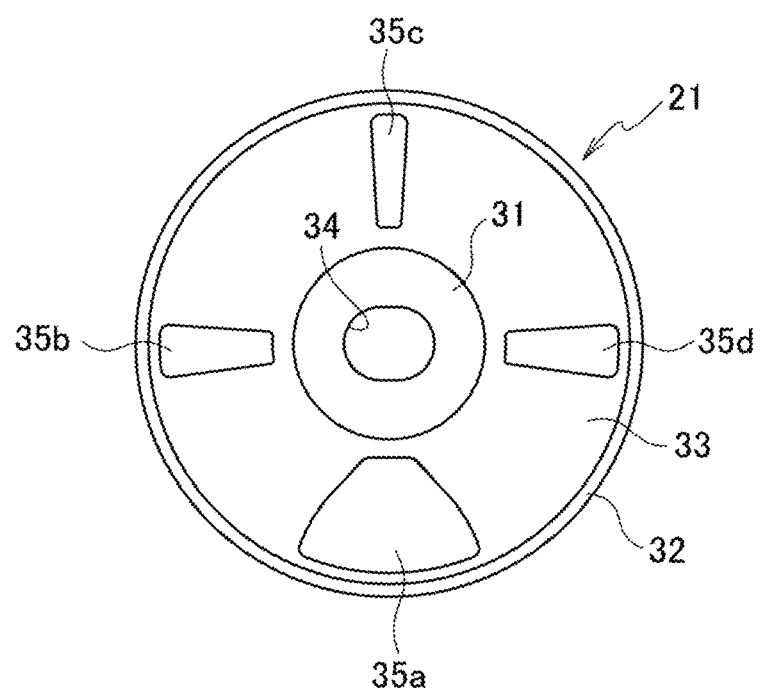
FIG. 5 is a diagram illustrating a bush mount as viewed from a vehicle front-rear direction.

Slits 35a, 35b, 35c, and 35d are formed in an upper part, a lower part, a left part, and a right part of the elastic body 33 individually (see FIG. 5). Each bush mount 21 having this kind of elastic body 33 is configured to receive a load mainly as a shear load.

If the lower part of the elastic body 33 in FIG. 5 is set at a position of zero degrees, the slit 35a is formed at a position of zero degrees (lower part of elastic body 33). Further, in a clockwise direction from the position of zero degrees, the slit 35b is formed at a position of 90 degrees (right side part of elastic body 33 in vehicle width direction), the slit 35c is formed at a position of 180 degrees (upper part of elastic body 33), and the slit 35d is formed at a position of 270 degrees (left side part of elastic body 33 in vehicle width direction).

In the present embodiment, an opening area of the slit 35a at the position of 0 degrees, among the four slits 35a, 35b, 35c, and 35d, is the largest as viewed from the vehicle front-rear direction. Further, an opening area of the slit 35c at the position of 180 degrees, among the four slits 35a, 35b, 35c, and 35d, is the smallest as viewed from the vehicle front-rear direction.

Further, in the bush mount 21 in FIG. 5, the long hole 34 in the inner cylinder 31 is formed so as to be along the vehicle width direction (left-right direction of FIG. 5).

The inner cylinder 31 and outer cylinder 32 are formed of metal materials such as aluminum or iron, for example. Meanwhile, the elastic body 33 is formed of an elastic member such as rubber, for example.

The stopper 22 includes a stopper plate 41 and an elastic ring 42.

The stopper plate 41 is formed of a metal material such as aluminum or iron, for example. Meanwhile, the elastic ring 42 is formed of an elastic member such as rubber, for example.

The stopper plate 41 has a function as a washer interposed between an inner cylinder 31 end surface of the bush mount 21 and a head part of the fastening member (bolt) 23, and a function of regulating the amount of swing of the motor unit 3 relative to the vehicle front-rear direction.

In the present embodiment, on the front side of the bush mount 21 located on the front side, the stopper plate 41 on the front side is attached, and on the rear side of the bush mount 21 located on the rear side, the stopper plate 41 on the rear side is attached.

Each of the stopper plate 41 on the front side and the stopper plate 41 on the rear side is fastened to the inner cylinder 31 by the fastening member 23, and extends from an inner peripheral side to an outer peripheral side to a position opposite to the outer cylinder 32 or a peripheral edge part of the support hole 11 in the vehicle front-rear direction.

A recessed part 43 for accommodating an end part of the fastening member 23 is disposed in a front side surface of the stopper plate 41 on the front side attached to the bush mount 21 on the front side, and a peripheral edge part of the recessed part 43 is positioned in front of the end part of the fastening member 23 in the vehicle front-rear direction.

In the present embodiment, on the stopper plate 41 on the front side, an annular projecting part 45 projecting forward in the vehicle front-rear direction is formed, and the recessed part 43 is disposed radially inward of the projecting part 45.

In order to accommodate the end part of the fastening member 23 in the recessed part 43 of the stopper plate 41 on the front side, the depth of the recessed part 43 is larger than the length from a bottom surface of the recessed part 43 to a distal end of the head part of the fastening member 23.

Meanwhile, the elastic ring 42 is disposed on a rear side surface of the stopper plate 41 on the front side, and the elastic ring 42 is opposite to the outer cylinder 32 or the peripheral edge part of the support hole 11.

Among a clearance CL1 in the vehicle front-rear direction between the stopper 22 on the front side, and the outer cylinder 32 or the peripheral edge part of the support hole 11, the smallest clearance is smaller than the smallest clearance in the vehicle front-rear direction between the motor unit 3 and the frame 2 on the rear side of the motor unit 3.

A recessed part 43 for accommodating an end part of the fastening member 23 is disposed in a rear side surface of the stopper plate 41 on the rear side attached to the bush mount 21 on the rear side, and a peripheral edge part of the recessed part 43 is located behind the end part of the fastening member 23 in the vehicle front-rear direction.

In the present embodiment, on the stopper plate 41 on the rear side, an annular projecting part 45 projecting rearward in the vehicle front-rear direction is formed, and the recessed part 43 is disposed radially inward of the projecting part 45.

In order to accommodate the end part of the fastening member 23 in the recessed part 43 of the stopper plate 41 on the rear side, the depth of the recessed part 43 is larger than the length from a bottom surface of the recessed part 43 to a distal end of the head part of the fastening member 23.

Meanwhile, an elastic ring 42 is disposed on a front side surface of the stopper plate 41 on the rear side, and the elastic ring 42 is opposite to the outer cylinder 32 or the peripheral edge part of the support hole 11.

Among a clearance CL2 in the vehicle front-rear direction between the stopper 22 on the rear side, and the outer cylinder 32 or the peripheral edge part of the support hole 11, the smallest clearance is smaller than the smallest clearance in the vehicle front-rear direction between the motor unit 3 and the frame 2 on the front side of the motor unit 3.

In one embodiment, the stopper plate 41 on the front side may be attached on the front side of the bush mount 21 located on the rear side, and the stopper plate 41 on the rear side may be attached on the rear side of the bush mount 21 located on the front side.

In another embodiment, the stopper plate 41 on the front side may be attached on the front side of the bush mount 21 located on the front side, and the stopper plate 41 on the rear side may be attached on the rear side of the bush mount 21 located on the front side.

In still another embodiment, the stopper plate 41 on the front side may be attached on the front side of the bush mount 21 located on the rear side, and the stopper plate 41 on the rear side may be attached on the rear side of the bush mount 21 located on the rear side.

Figure 6:
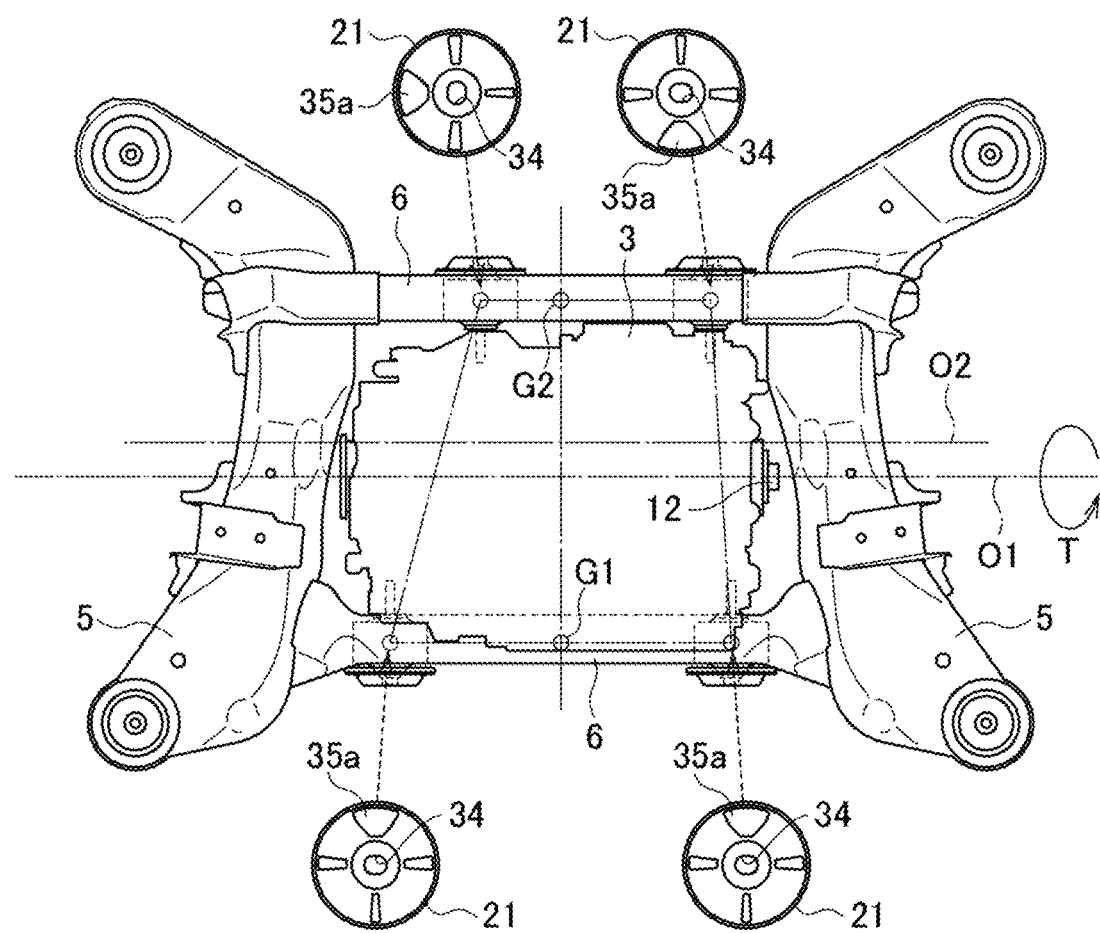
FIG. 6 is an explanatory diagram illustrating a state in which four bush mounts are disposed in a motor mount system.

FIG. 6 illustrates the frame 2 in plan view and the four bush mounts 21 in front view. A dash-dot-dash line O1 indicates the center of the output shaft of the motor unit 3, and a dash-dot-dash line O2 indicates the center of a roll of the motor unit 3.

Among the four bush mounts 21, the bush mounts 21 on the front side disposed in front of the motor unit 3 are disposed at symmetrical positions relative to a center of gravity (virtual input center) G1 of the driving reaction force input to the two bush mounts 21 on the front side.

That is, distances from the center of gravity G1 of the driving reaction force input to the two bush mounts 21 on the front side, to the bush mounts 21 on the front side disposed in front of the motor unit 3 are approximately equal to each other.

Meanwhile, among the four bush mounts 21, the bush mounts 21 on the rear side disposed behind the motor unit 3 are disposed at asymmetrical positions relative to a center of gravity (virtual input center) G2 of the driving reaction force input to the two bush mounts 21 on the rear side.

More specifically, the bush mount 21 on the rear side located on the right side in the vehicle width direction is disposed inward in the vehicle width direction from a symmetrical position relative to the center of gravity G2 of the driving reaction force input to the two bush mounts 21 on the rear side.

That is, a distance from the center of gravity G2 of the driving reaction force input to the two bush mounts 21 on the rear side, to the bush mount 21 on the rear side located on the right side in the vehicle width direction, is shorter than a distance from the center of gravity G2 to the bush mount 21 on the rear side located on the left side in the vehicle width direction.

In the present embodiment, among the four bush mounts 21, the bush mount 21 on the rear side located on the right side in the vehicle width direction is closest to the center of gravity G1 or G2 of the driving reaction force described above, and the bush mount 21 is disposed in a state where the bush mount 21 is rotated in a direction of the bush mount 21 having the rigidity to the load in the vertical direction which is higher than that of other bush mounts 21.

Specifically, the bush mounts 21 on the front side are disposed such that the slits 35a having the largest opening area as viewed from the vehicle front-rear direction face a directed for receiving the driving reaction force (acceleration direction), that is, to face upward in the present embodiment.

The bush mount 21 on the rear side located on the left side in the vehicle width direction is disposed such that the slit 35a having the largest opening area as viewed from the vehicle front-rear direction faces a directed for receiving the driving reaction force (acceleration direction), that is, to face downward in the present embodiment.

The bush mount 21 on the rear side located on the right side in the vehicle width direction is disposed in a state where the bush mount 21 is rotated by 90 degrees clockwise compared with the bush mount 21 on the rear side located on the left side in the vehicle width direction. For this reason, the bush mount 21 on the rear side located on the right side in the vehicle width direction is disposed such that the slit 35a having the largest opening area as viewed from the vehicle front-rear direction faces the outside in the vehicle width direction, that is, faces the right side in the vehicle width direction in the present embodiment.

Further, among the four bush mounts 21, the bush mount 21 on the rear side located on the right side in the vehicle width direction is disposed in a state where the bush mount 21 is rotated in a direction of the bush mount 21 having the rigidity to the load in the vertical direction which is higher than that of other bush mounts 21, and the bush mount 21 is disposed such that a long axis of the long hole 34 is along the vertical direction. Meanwhile, other bush mounts 21 are disposed such that long axes of the long holes 34 are along the vehicle width direction.

In one embodiment, the bush mount 21 on the front side located on the left side in the vehicle width direction is located at an opposing corner of a rectangle, relative to the bush mount 21 on the rear side located on the right side in the vehicle width direction, and the bush mount 21 on the left side may be disposed in a state where the bush mount 21 is rotated in a direction of the bush mount 21 having the rigidity to the load in the vertical direction which is higher than that of other bush mounts 21.

In another embodiment, both of the bush mount 21 on the rear side located on the right side in the vehicle width direction, and the bush mount 21 on the front side located on the left side in the vehicle width direction, may be disposed in a state where both of the bush mounts 21 are rotated in a direction of the both bush mounts 21 having the rigidity to the load in the vertical direction which is higher than that of other bush mounts 21.

[Regulation of the Amount of Swing of Motor Unit 3 Relative to Vehicle Front-Rear Direction]

Actions and effects of regulating the amount of swing of the motor unit 3 relative to the vehicle front-rear direction will be described below with reference to FIG. 4.

In the present embodiment, on the front side of the bush mount 21 located on the front side, the stopper 22 on the front side (stopper plate 41 on front side) is attached. In addition, among the clearance CL1 in the vehicle front-rear direction between the stopper 22 on the front side and the outer cylinder 32 or the peripheral edge part of the support hole 11, the smallest clearance thereof is smaller than the smallest clearance in the vehicle front-rear direction between the motor unit 3 and the frame 2 on the rear side of the motor unit 3.

Therefore, when the motor unit 3 swings to the rear side in the vehicle front-rear direction, the stopper 22 on the front side always abuts the outer cylinder 32 or the peripheral edge part of the support hole 11 first, and therefore it is possible to regulate the amount of swing of the motor unit 3 relative to the rear side in the vehicle front-rear direction. This can avoid contact between the motor unit 3 and the frame 2.

Meanwhile, on the rear side of the bush mount 21 located on the rear side, the stopper 22 on the rear side (stopper plate 41 on rear side) is attached. Among the clearance CL2 in the vehicle front-rear direction between the stopper 22 on the rear side and the outer cylinder 32 or the peripheral edge part of the support hole 11, the smallest clearance thereof is smaller than the smallest clearance in the vehicle front-rear direction between the motor unit 3 and the frame 2 on the front side of the motor unit 3.

Therefore, when the motor unit 3 swings to the front side in the vehicle front-rear direction, the stopper 22 on the rear side always abuts the outer cylinder 32 or the peripheral edge part of the support hole 11 first, and therefore it is possible to regulate the amount of swing of the motor unit 3 relative to the front side in the vehicle front-rear direction. This can avoid contact between the motor unit 3 and the frame 2.

[Suppression of Shaft Deviation of Output Shaft of Motor Unit 3]

Figure 7:
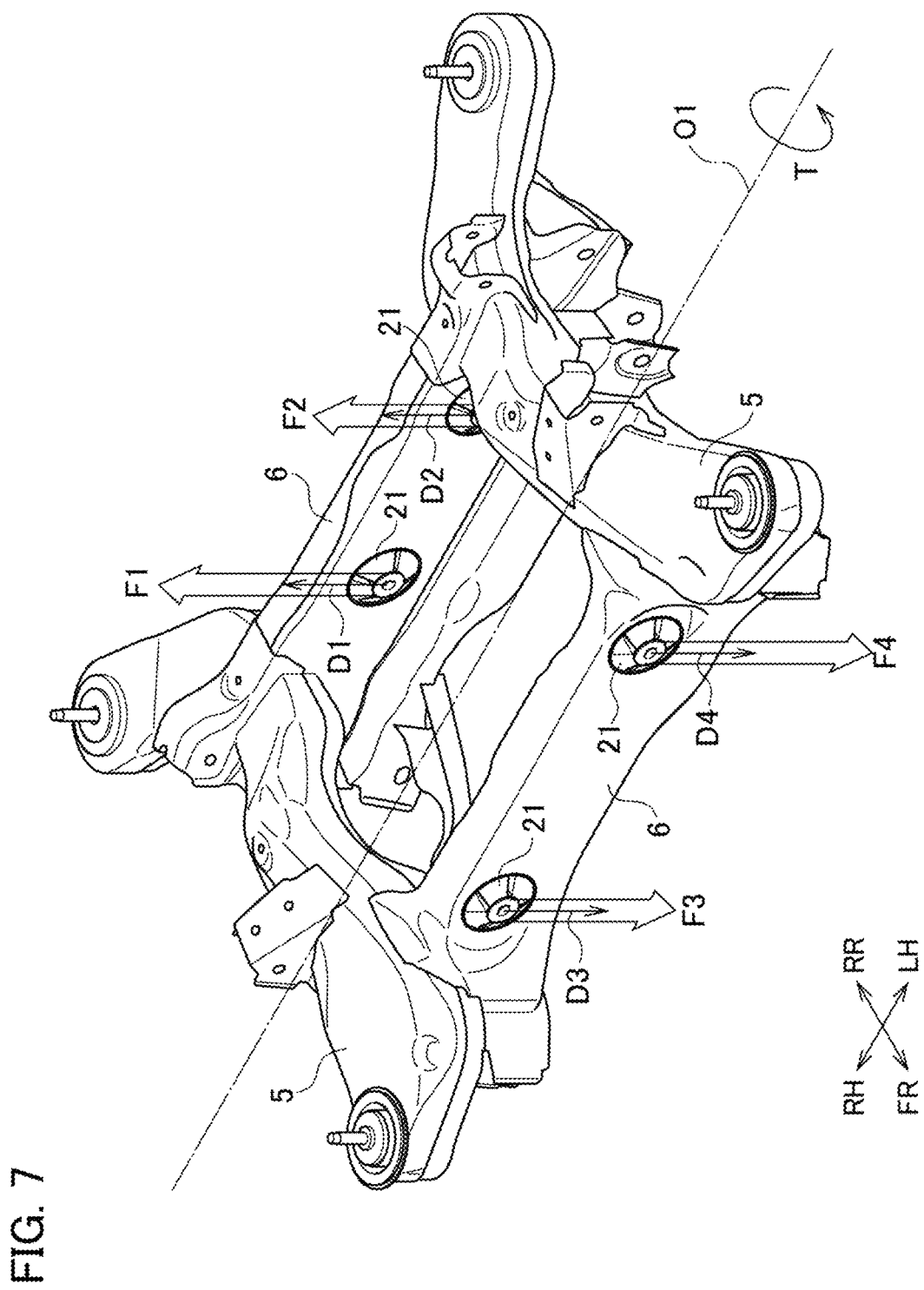
FIG. 7 is an explanatory diagram illustrating actions and effects of suppressing shaft deviation of an output shaft of a motor unit.

Actions and effects of suppressing shaft deviation of the output shaft of the motor unit 3 will be described below with reference to FIGS. 6 and 7.

In the present embodiment, among the four bush mounts 21, the bush mount 21 on the rear side located on the right side in the vehicle width direction is disposed inward in the vehicle width direction from the symmetrical position relative to the center of gravity G2 of the driving reaction force input to the two bush mounts 21 on the rear side.

Therefore, force F1 acting on the bush mount 21 on the rear side located on the right side in the vehicle width direction, and force F4 acting on the bush mount 21 on the front side located on the left side in the vehicle width direction, the bush mount 21 being located at an opposing corner of a rectangle, are larger than force F2 and force F3 acting on other bush mounts 21.

If all of the four bush mounts 21 have the same rigidity to the load in the vertical direction, a difference occurs in the displacement amounts D1 to D4 in the vertical direction between other bush mounts 21, and the bush mount 21 on the rear side located on the right side in the vehicle width direction, and the bush mount 21 on the front side located on the left side in the vehicle width direction. As a result, shaft deviation may occur on the output shaft 12 of the motor unit 3.

Therefore, in the present embodiment, among the four bush mounts 21, the bush mount 21 on the rear side located on the right side in the vehicle width direction, the bush mount 21 being closest to the center of gravity G1 or G2 of the driving reaction force described above, is disposed in a state where the bush mount 21 is rotated in a direction of the bush mount 21 having the rigidity to the load in the vertical direction which is higher than that of other bush mounts 21.

Therefore, even if the bush mount 21 on the rear side located on the right side in the vehicle width direction, and the bush mount 21 on the front side located on the left side in the vehicle width direction receive the large force F1 and F4 in the vertical direction, the bush mounts 21 are less likely to be displaced. As a result, the displacement amounts D1 to D4 in the vertical direction can be made equal between other bush mounts 21, and the bush mount 21 on the rear side located on the right side in the vehicle width direction, and the bush mount 21 on the front side located on the left side in the vehicle width direction, and the shaft deviation of the output shaft 12 of the motor unit 3 can be reduced.

[Actions and Effects and the Like]

Actions and effects according to the present embodiment will be described below.

(1) The motor mount system 1 includes the motor unit 3 which is disposed such that the output shaft 12 thereof is along the vehicle width direction and generates a driving torque for vehicle travel. The motor mount system 1 includes the four bush mounts 21 to which the reaction force of the driving torque T is input in the vertical direction, the two bush mounts 21 thereof being disposed in front of the motor unit 3 and the two bush mounts 21 thereof being disposed behind the motor unit 3, and central axes C3 thereof being arranged so as to be along the vehicle front-rear direction. The motor mount system 1 includes the frame 2 for supporting the motor unit 3 via the four bush mounts 21. The four bush mounts 21 have the same configuration as each other and are configured such that the rigidity to the load in a direction orthogonal to each central axis C3 changes along the circumferential direction. Among the four bush mounts 21, a first bush mount 21 is closest to the center of gravity G1 of the driving reaction force input to the two bush mounts 21 disposed in front of the motor unit 3, or the center of gravity G2 of the driving reaction force input to the two bush mounts 21 disposed behind the motor unit 3, and a second bush mount 21 is located at an opposing corner of the first bush mount 21 in a rectangle having the positions of the four bush mounts 21 as apexes, and at least one of the first bush mount 21 and the second bush mount 21 is disposed in a state where at least one of the first bush mount 21 and the second bush mount 21 is rotated in a direction in which the rigidity to the load in the vertical direction is higher than the rigidity of other bush mounts 21.

The four bush mounts 21 have the same configuration as each other. At least one of the first bush mount 21 closest to the center of gravity G1 or G2 of the driving reaction force for the four bush mounts 21, and the second bush mount 21 located at an opposing corner of a rectangle relative to the first bush mount 21 is disposed in a state where at least one of the first bush mount 21 and the second bush mount 21 is rotated in a direction in which the rigidity to the load in the vertical direction is higher than the rigidity of other bush mounts 21.

Therefore, even if the inner cylinders 31 of the first and second bush mounts 21 receive large force in the vertical direction, the inner cylinders are less likely to be displaced. As a result, the displacement amounts D1, D2, D3, and D4 in the vertical direction can be made equal between the inner cylinders 31 of the first and second bush mounts 21 and the inner cylinders 31 of other bush mounts 21, and the shaft deviation of the output shaft 12 of the motor unit 3 can be reduced.

That is, by arranging the four bush mounts 21 individually as described above, a rigidity difference can be set according to the arrangement positions of the four bush mounts 21. Therefore, all of the displacement amounts D1, D2, D3, and D4 of the four bush mounts 21 when receiving the driving reaction force can be made equal, and it is possible to suppress the shaft deviation of the output shaft 12 of the motor unit 3 caused by an asymmetric arrangement of the bush mounts 21.

Due to the four bush mounts 21 having the same configuration as each other, the four bush mounts 21 can be uniformly constituted by the same parts, and the common use of parts can be achieved.

(2) The bush mount 21 includes the inner cylinder 31 which is fastened to the motor unit 3 by the fastening member 23 and has the long hole 34 through which the shaft part of the fastening member 23 is inserted, and the outer cylinder 32 press-fitted into the support hole 11 disposed in the frame 2. The bush mount 21 includes the elastic body 33 disposed between an outer periphery of the inner cylinder 31 and an inner periphery of the outer cylinder 32. Among the four bush mounts 21, at least one of the first bush mount 21 and the second bush mount 21 disposed in a state where at least one of the first bush mount 21 and the second bush mount 21 is rotated in a direction in which the rigidity to the load in the vertical direction is higher than the rigidity of other bush mounts 21, is disposed such that a long axis of the long hole 34 is along the vertical direction. Oher bush mounts 21 are disposed such that long axes of the long holes 34 are along the vehicle width direction.

Among the four bush mounts 21, at least one of the first bush mount 21 and the second bush mount 21 disposed in a state where at least one of the first bush mount 21 and the second bush mount 21 is rotated in a direction in which the rigidity to the load in the vertical direction is higher than the rigidity of other bush mounts 21, is disposed such that a long axis of the long hole 34 is along the vertical direction. Meanwhile, other bush mounts 21 are disposed such that long axes of the long holes 34 are along the vehicle width direction.

Therefore, a rigidity difference can be set between the first and second bush mounts 21 disposed such that a long axis of the long hole 34 is along the vertical direction, and other bush mounts 21 disposed such that long axes of the long holes 34 are along the vehicle width direction. As a result, both the setting of the rigidity difference and the absorption of part variation can be achieved.

That is, by arranging the four bush mounts 21 individually as described above, the part variation of the motor mount system 1 can be absorbed. Specifically, among the four bush mounts 21, if long holes of the three bush mounts 21 are made into horizontal holes, and a long hole of the remaining one bush mount 21 is made into a vertical hole, it is possible to absorb the part variation of the motor mount system 1. Therefore, by attaching the bush mount 21 described above in a state where the bush mount 21 is rotated by 90 degrees, both the setting of the rigidity difference and the absorption of part variation can be achieved.

As described above, although an embodiment of the present invention has been described, it should not be understood that the arguments and drawings forming part of this disclosure are intended to limit the present invention. Various alternative embodiments, examples, and operational techniques will be apparent to those skilled in the art from this disclosure.

REFERENCE SIGNS LIST

1 Motor mount system
2 Frame
11 Support hole
12 Output shaft
21 Bush mount (motor mount)
22 Stopper
23 Fastening member (bolt)
31 Inner cylinder
32 Outer cylinder
33 Elastic body
34 Long hole
G1 Center of gravity (virtual input center)
G2 Center of gravity (virtual input center)
T Driving torque

The invention claimed is:

1. A motor mount system comprising:
a motor unit that is disposed such that an output shaft thereof is along a vehicle width direction and generates a driving torque for vehicle travel;
four bush mounts to which reaction force of the driving torque is input in a vertical direction, two bush mounts thereof being disposed in front of the motor unit and two bush mounts thereof being disposed behind the motor unit, and central axes thereof being arranged so as to be along a vehicle front-rear direction; and
a frame that supports the motor unit via the four bush mounts, wherein
the four bush mounts have configurations that are identical to each other and are configured such that rigidity to a load in a direction orthogonal to the central axes changes along a circumferential direction, and among the four bush mounts, a first bush mount is closest to a center of gravity of the reaction force input to the two bush mounts disposed in front of the motor unit, or a center of gravity of the reaction force input to the two bush mounts disposed behind the motor unit, a second bush mount is located at an opposing corner of the first bush mount in a rectangle having positions of the four bush mounts as apexes, and at least one of the first bush mount and the second bush mount is disposed in a state where at least one of the first bush mount and the second bush mount is rotated in a direction in which rigidity to the load in the vertical direction is higher than rigidity of other bush mounts.

2. The motor mount system according to claim 1, wherein each of the bush mounts includes an inner cylinder that is fastened to the motor unit by a fastening member and has a long hole through which a shaft part of the fastening member is inserted, an outer cylinder that is press-fitted into a support hole disposed in the frame, and an elastic body disposed between an outer periphery of the inner cylinder and an inner periphery of the outer cylinder, among the four bush mounts, at least one of the first bush mount and the second bush mount disposed in the state where at least one of the first bush mount and the second bush mount is rotated in the direction in which the rigidity to the load in the vertical direction is higher than the rigidity of other bush mounts, is disposed such that a long axis of the long hole is along the vertical direction, and other bush mounts are disposed such that long axes of long holes are along the vehicle width direction.

* * * * *